United States Patent
Gustafsson

(10) Patent No.: US 7,076,250 B2
(45) Date of Patent: Jul. 11, 2006

(54) METHOD AND SYSTEM FOR PLANNING AND/OR EVALUATION OF DOWNLINK COVERAGE IN (CDMA) RADIO NETWORKS

(75) Inventor: Nils Anders Stefan Gustafsson, The Hague (NL)

(73) Assignee: Koninklijke KPN N.V., The Hague (NL)

(*) Notice: Subject to any disclaimer, the term of this patent is extended or adjusted under 35 U.S.C. 154(b) by 478 days.

(21) Appl. No.: 10/358,085

(22) Filed: Feb. 4, 2003

(65) Prior Publication Data
US 2003/0148782 A1    Aug. 7, 2003

Related U.S. Application Data

(60) Provisional application No. 60/355,015, filed on Feb. 7, 2002.

(51) Int. Cl.
*H04Q 7/20* (2006.01)
(52) U.S. Cl. ............... 455/436; 455/446; 455/450; 370/254; 370/244; 370/335
(58) Field of Classification Search ............. 455/446, 455/436, 450; 370/254, 244, 335
See application file for complete search history.

(56) References Cited

U.S. PATENT DOCUMENTS

| | | | | |
|---|---|---|---|---|
| 5,561,841 A | * | 10/1996 | Markus | 455/446 |
| 6,111,857 A | * | 8/2000 | Soliman et al. | 370/254 |
| 6,487,414 B1 | * | 11/2002 | Tanay et al. | 455/450 |

* cited by examiner

*Primary Examiner*—Lee Nguyen
*Assistant Examiner*—Sanh Phu
(74) *Attorney, Agent, or Firm*—Michaelson & Associates; Peter L. Michaelson

(57) ABSTRACT

Method and system for planning and/or evaluation of downlink coverage in a (CDMA) radio network. A service area of the radio network can be divided into pixels defined by a grid, and cells can be assigned to the pixels. After assigning pilot power, desired downlink transmission power can be estimated for the cell, which can then be compared to maximum transmission power of the base station. If needed changes in the radio network are to be made, the planning and/or evaluation is restarted.

26 Claims, 1 Drawing Sheet

METHOD AND SYSTEM FOR PLANNING AND/OR EVALUATION OF DOWNLINK COVERAGE IN (CDMA) RADIO NETWORKS

CLAIM TO PRIORITY

This application claims the benefit of co-pending United States provisional patent application entitled "UMTS Planning Downlink" filed Feb. 7, 2002 and assigned Ser. No. 60/355,015, which is incorporated by reference herein.

FIELD OF THE INVENTION

The invention relates to a method and a system for planning and/or evaluation of radio networks. More specifically, the invention relates to a method and system for planning and/or evaluation of downlink coverage in (CDMA) radio networks comprising at least one base station that defines at least one cell.

BACKGROUND OF THE INVENTION

In recent years the concept of (wideband) code division multiple access (CDMA) has gained widespread international acceptance by operators active in the field of wireless communications. CDMA can significantly increase the capacity and the service quality and options of the networks when exploited by these operators.

One of the consequences of this development is the increase in interest in the planning and/or evaluation of radio networks in general and CDMA radio networks in particular. Radio planning and/or evaluation typically involve stages such as dimensioning, detailed capacity and coverage planning and/or network optimization. Radio planning is important for e.g. quick and accurate response to changes in e.g. traffic conditions or to cope with future traffic demands and as a consequence provides an operator with competitive advantages. An accurate planning can contribute to higher cost efficiency in operating radio networks. Moreover, it is important to be able to change the network configuration quickly and accurately when there is a health risk due to misplacement of base stations or incorrect configuration of base stations. The dimensioning stage in radio planning involves the estimation of the number and configuration of network elements, based, among others, on the operator's requirements and the radio propagation in the area. In the capacity and coverage planning stage, base station locations, configurations and parameters are determined in more detail on the basis of e.g. real propagation data and estimated user density and traffic. In the network optimization stage, the overall experienced network quality is assessed and improved, if necessary.

The method and system for downlink coverage planning and/or evaluation according to the invention can be used in the coverage planning stage of the radio planning and/or evaluation, and is particularly useful as an addition to an uplink coverage planning and/or evaluation.

At present the most popular and widely used method for the planning and evaluation of CDMA radio networks is a static Monte-Carlo simulation. This simulation involves the random generation of multiple network states defined by the number of users of the network and their positions. Users are generated a number of times. The multiple states are analyzed and the results of the analysis are evaluated. From the statistics results such as the maximum cell capacity and the cell coverage can be determined.

An important drawback of the Monte-Carlo and other simulations is the desired time to obtain reliable results. Moreover the known simulation methods do not possess the ability to quickly optimize a network or introduce a new site and see its effects on the downlink coverage of the radio network.

PROBLEM DEFINITION

The prior art fails to disclose a solution for fast and/or reliable planning and/or evaluation of downlink coverage in radio networks.

AIM OF THE INVENTION

The aim of the invention is to provide a solution for fast and/or reliable planning and/or evaluation of downlink coverage in radio networks.

SUMMARY OF THE INVENTION

The present invention provides a solution for fast and/or reliable planning and/or evaluation of downlink coverage in radio networks, possibly being CDMA radio networks.

According to an aspect of the invention, a method and system are provided for the planning and/or evaluation of a downlink coverage in a radio network comprising one or more service areas, each service area comprising at least one base station defining at least one cell.

The method can comprise the following steps or a subset of the following steps, where the system can comprise means to handle these steps:

Defining a grid on the one or more service areas. It is possible to use a grid definition derived from a planning and/or evaluation of an uplink coverage performed prior to the downlink planning and/or evaluation.

Assigning the at least one cell to pixels defined by the grid. It is possible to use a cell-to-pixel assignment derived from a planning and/or evaluation of an uplink coverage performed prior to the downlink planning and/or evaluation.

Assigning a pilot power to the at least one cell. The pilot power is a fixed proportion of the total transmission power needed for signaling purposes.

Estimating a desired downlink transmission power for the at least one cell. This can be done using the formula $P_{BS}=P_{traffic}+P_{pilot}$, where $P_{pilot}$ is the pilot power and $$P_{traffic} = \frac{\frac{\left(\frac{E_b}{N_0}\right)_{req}}{G_{traffic}} \sum_{p=1}^{\Pi} N_p [L_p(N_{th} + I_{other,p}) + \omega_p P_{pilot}]}{1 - \frac{\left(\frac{E_b}{N_0}\right)_{req}}{G_{traffic}} \sum_{p=1}^{\Pi} N_p \omega_p}$$

is a power for one or more downlink traffic channels. An inter-cell interference effect and/or a soft handover effect can be included in the estimation of the desired downlink transmission power.

Comparing the desired downlink transmission power to a maximum transmission power of the one or more base stations. The maximum transmission power does not necessarily have to be the maximum physically possible transmission power. It can be a predefined maximum transmission power, which is less than the maximum physically possible transmission power. If the desired downlink transmission power is larger than the maximum transmission power, one or more changes in the radio network can be made and the planning and/or evaluation of the downlink coverage can be restarted. A change in the radio network can be an expansion of the radio network by adding one or more cells, sectors or frequencies. It can also be a reduction of the pilot power. If the maximum transmission power is not exceeded by the desired downlink transmission power, the estimated desired downlink transmission power can be validated, and the planning and/or evaluation of the downlink coverage can be restarted if the outcome of the validation is that the estimated desired downlink transmission power is invalid. The validation can be a comparison of the downlink coverage for a pilot signal to the downlink coverage for one or more downlink traffic channels. The pilot power can be changed if the pilot signal is too small or too large in comparison to the traffic signal. The validation can also be an evaluation whether the estimated desired downlink transmission power does not limit any assumptions made in a planning and/or evaluation of an uplink coverage performed prior to the downlink planning and/or evaluation. If needed one or more parameters in the radio network can be changed.

The system can comprise one or more modules. One or more modules can be provided to make one or more changes in the radio network and restart the planning and/or evaluation of the downlink coverage. One or more modules can be provided to expand the radio network by adding one or more cells, sectors or frequencies. One or more modules can be provided to reduce the pilot power. One or more modules can be provided to validate the estimated desired downlink transmission and restart the planning and/or evaluation of the downlink coverage. One or more modules can be provided to compare the downlink coverage for a pilot signal to the downlink coverage for the one or more downlink traffic channels and change the pilot power if the pilot signal is too small or too large in comparison to the traffic signal. One or more modules can be provided to evaluate whether the estimated desired downlink transmission power does not limit any assumptions made in a planning and/or evaluation of an uplink coverage performed prior to the downlink planning and/or evaluation, and change one or more parameters in the radio network. One or more modules can be provided to derive a grid definition and a cell-to-pixels assignment used in a planning and/or evaluation of an uplink coverage performed prior to the downlink planning and/or evaluation. One or more modules can be provided to include an inter-cell interference effect in the estimation of the desired downlink transmission power. One or more modules can be provided to include a soft handover effect in the estimation of the desired downlink transmission power.

A computer program can be used to perform steps as mentioned above for the method and can comprise modules as mentioned above for the system. The computer program can run on a computer system, at least including software code portions for performing one or more steps of the method as mentioned above when run on the computer system.

A radio network comprising one or more service areas, each service area comprising at least one base station defining at least one cell, can determine the coverage using a method as mentioned above.

BRIEF DESCRIPTION OF THE DRAWINGS

The invention will be explained in greater detail by reference to exemplary embodiments shown in the drawings, in which.

DETAILED DESCRIPTION OF THE INVENTION

Figure 1:
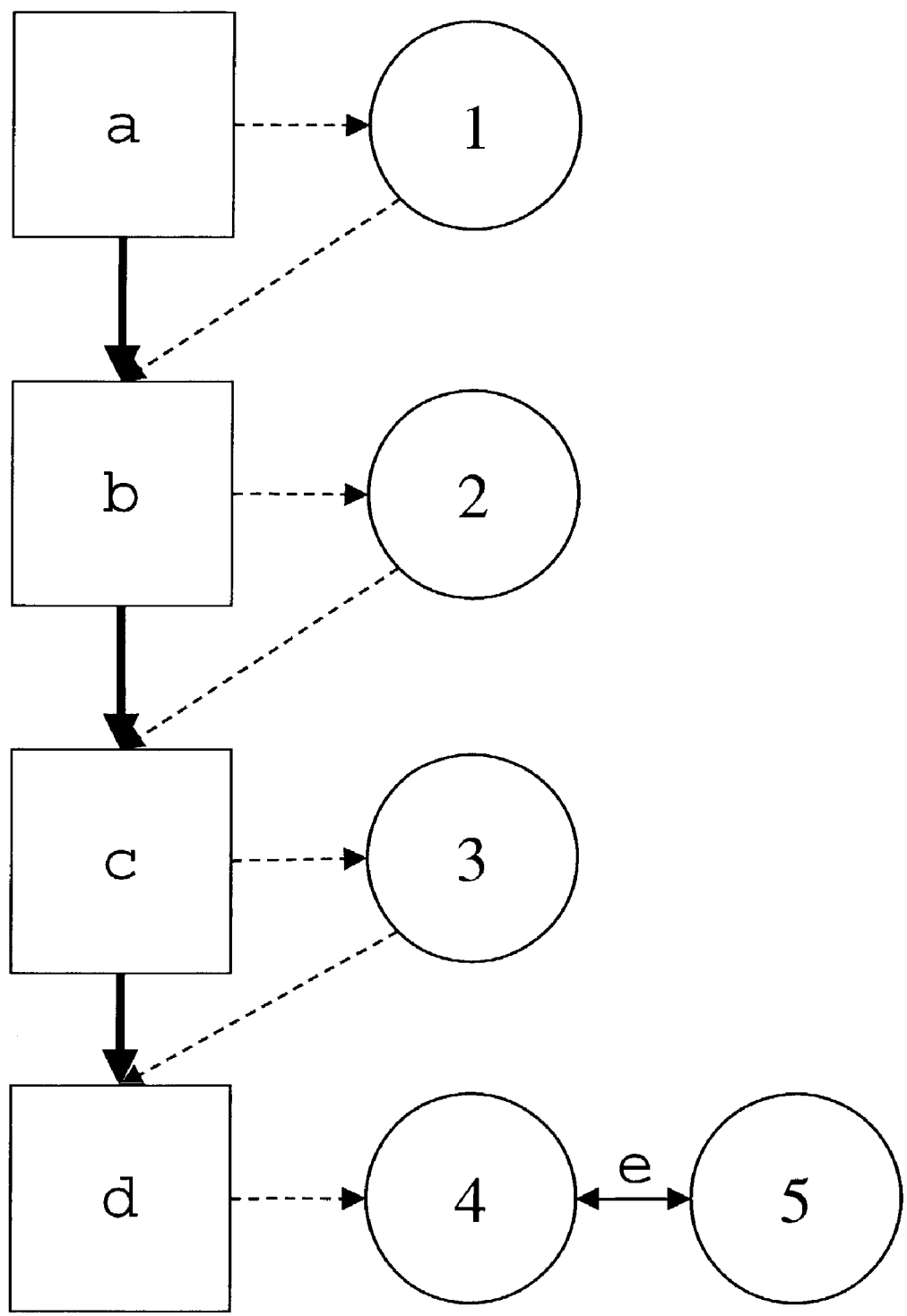
FIG. 1 shows a flowchart of the downlink coverage planning and/or evaluation according to an exemplary embodiment of the invention.

In a co-pending patent application EP01203391.6, an algorithm for evaluating the uplink (UL) is presented. This algorithm uses the noise rise as a main planning parameter. However, the downlink (DL) introduces some new problems in comparison with the UL and also in comparison with e.g. planning of a GSM system, especially because of the usage of a pilot signal.

In UMTS, the uplink (UL) will often be the critical link in a system with low or medium load. The purpose of the downlink (DL) planning and/or evaluation is to find out when the downlink is a limiting factor, given a certain configuration, which has been found providing sufficient coverage for the UL. The downlink can be the limiting factor when asymmetric services are considered. Preferably, one can thus consider the planning as a two-step process: first a UL planning is made, and then the DL is controlled.

In some respects, the downlink is more complicated than the uplink, especially because in the DL coverage has to be provided for both the pilot and traffic. The power assigned to the pilot signal is constant, whereas the power for the traffic signal for a particular user depends on many factors, e.g. bit rate, $E_b/N_0$-requirement, and interference from other base stations at the position of the user. Furthermore, the total available power is limited.

In the co-pending patent application EP01203391.6, for uplink planning and/or evaluation, the noise rise is used as a main planning variable, because it takes all important effects into account, such as inter-cell interference and cell load.

In the present invention for the downlink, the base station (BS) transmission power plays a similar role. It directly depends, among others, on inter-cell interference, target $E_b/N_0$ and the orthogonality factor. Therefore, the BS transmission (Tx) power is chosen as a main planning variable for the DL coverage evaluation.

Using the present invention, several analyses considering radio networks can be performed, including for example:
  verify whether the DL is the limiting factor in a planning scenario—if it is, actions to increase capacity can be taken;
  estimate the coverage area of the pilot and the traffic, and by repeating the process optimize the pilot power;
  verify that the input for the UL evaluation is correct.

For the purpose of teaching of the invention, preferred embodiments of the method and system of the invention are described in the sequel. It will be apparent to the person skilled in the art that other alternative and equivalent embodiments of the invention can be conceived and reduced to practice without departing from the true spirit of the invention, the scope of the invention being only limited by the claims as finally granted.

Basic Process

FIG. 1 shows a flowchart of the downlink coverage planning and/or evaluation. The letters a, b, c, d and e represent actions and the ciphers 1, 2, 3, 4 and 5 represent outcomes of actions. The outcomes can be used as an input for further actions, which is shown by the arrow back from the outcomes to the actions.

The basic process as described in an embodiment of the invention includes the following steps:
Grid (1) definition (a) on the service area and cell (2) assignment (b) to the pixels defined by the grid;
Assignment (c) of pilot power (3) to the cells;
Estimation (d) of the DL desired transmission power (4);
Comparison (e) of the desired DL transmission power (4) with the maximum BS power (5).

The steps can be performed iteratively. If the desired DL transmission power is less than the maximum BS power, other actions such as the construction of coverage plots for further system evaluation can be executed.

BEST MODE EMBODIMENT

A preferred version of the invention includes the following main steps (it is described in detail below):
1. After having performed the UL evaluation using the method of the co-pending patent application EP01203391.6, the pilot powers are assigned and the DL evaluation can be started.
2. The DL transmission power needed to obtain traffic coverage of the same area as in the UL is estimated. Inter-cell interference is taken into account in a similar manner as for the UL evaluation, i.e. through iterations.
3. a) If the desired DL transmission power is larger than the maximum BS power, the DL is a limiting factor. Changes in the configuration can be made and the evaluation must then be restarted.
   b) If the desired DL transmission power is less than or equal to the maximum BS power, the DL is not the limiting factor. One can then continue with the final evaluation.
4. The final evaluation consists of making coverage plots, estimating the outage probabilities. One needs also to check whether UL and DL coverage areas coincide. If necessary, pilot powers can be adjusted and the evaluation is re-started.

Note that the basic part of the algorithm, the calculation of the desired base station transmission power in step 2, can be used in other ways as well. The procedure above may be the most convenient one if no problems are expected in the downlink.

An important part of the algorithm comprises estimating the desired power for the downlink traffic channels. This is done for each cell. The interference from other cells is taken into account in a similar way as for the UL evaluation of the co-pending patent application EP01203391.6, i.e. first some initial estimate is used, and through iterations this estimate is refined until the algorithms converge. Note that the interference from another cell is limited to the range given by the minimum transmission power (assigned to the pilot) and maximum power of the base station, attenuated through propagation loss.

Desired Tx Power for a BS

In this section an expression is deduced for the desired transmission power for a BS, given the pilot power and a certain interference situation. Denote the base station Tx power for a certain cell with $P_{BS}$. It can be split up in two parts, one for traffic, $P_{traffic}$, and one for the pilot channel, $P_{pilot}$. The pilot power is a fixed proportion of the total transmission power needed for signaling purposes.

The realized $E_b/N_o$ for the pilot channel in a certain pixel p is $$\left(\frac{E_b}{N_0}\right)_{pilot,p} = G_{pilot} \frac{P_{pilot}}{N_{th} + I_{own,p} + I_{other,p}} \frac{1}{L_p}, \quad (1)$$

where $G_{pilot}$ is the so-called processing gain for the pilot channel, $P_{pilot}$ is the power of the pilot, $N_{th}$ is the thermal noise, $I_{own,p}$ is the interference from the cell of interest (the "own" cell), $I_{other,p}$ is the interference from all other cells and $L_p$ is the path loss from the base station of the cell of interest to the pixel p.

The own cell interference can be written as $$I_{own,p} = \frac{\omega_p P_{BS}}{L_p}, \quad (2)$$

where $\omega_p$ is the orthogonality factor ($\omega_p=0$ means orthogonal signals); it may depend on the pixel in order to incorporate the local propagation conditions.

The desired $E_b/N_0$ for a traffic channel is denoted $(E_b/N_0)_{req}$. Suppose that the transmitted power for one user in pixel p is $P_p$, and that this power is chosen such that the realized $E_b/N_0$ is equal to the desired $E_b/N_0$. This leads to the following relation:

$$\left(\frac{E_b}{N_0}\right)_{req} = G_{traffic} \frac{P_p}{N_{th} + I_{own,p} + I_{other,p}} \frac{1}{L_p}, \quad (3)$$

or rewritten $$P_p = \left(\frac{E_b}{N_0}\right)_{req} \frac{L_p(N_{th} + I_{own,p} + I_{other,p})}{G_{traffic}}. \quad (4)$$

Suppose that there is not one user in pixel p, but $N_p$ users (a number which may be fractional). Then the power desired for the traffic channels in this pixel is $N_p P_p$. It is assumed that for the $N_p$ users within one pixel, the total desired power is the sum of the power desired for each user. Given a certain coverage area of $\Pi$ pixels, $p=1, \ldots, \Pi$, and excluding soft handover effects (however, as described later, these soft HO effects can be included), the total necessary power for the traffic channels is the sum of the power for all pixels, that is $$P_{traffic} = \sum_{p=1}^{\Pi} N_p P_p = \sum_{p=1}^{\Pi} N_p \left(\frac{E_b}{N_0}\right)_{req} \frac{L_p(N_{th} + I_{own,p} + I_{other,p})}{G_{traffic}}. \quad (5)$$

Note that $$I_{own,p} = \frac{\omega_p(P_{pilot} + P_{traffic})}{L_p}. \quad (6)$$

Then it can be solved for $P_{traffic}$:

$$P_{traffic} = \sum_{p=1}^{\Pi} N_p \left(\frac{E_b}{N_0}\right)_{req} \frac{L_p\left(N_{th} + \frac{\omega_p(P_{pilot} + P_{traffic})}{L_p} + I_{other,p}\right)}{G_{traffic}} \quad (7a)$$

$$= \frac{\left(\frac{E_b}{N_0}\right)_{req}}{G_{traffic}} \sum_{p=1}^{\Pi} N_p[L_p(N_{th} + I_{other,p}) + \omega_p(P_{pilot} + P_{traffic})]$$

$$= \frac{\left(\frac{E_b}{N_0}\right)_{req}}{G_{traffic}} \sum_{p=1}^{\Pi} N_p \omega_p P_{traffic} + \frac{\left(\frac{E_b}{N_0}\right)_{req}}{G_{traffic}} \sum_{p=1}^{\Pi} N_p[L_p(N_{th} + I_{other,p}) + \omega_p P_{pilot}]$$

$$P_{traffic}\left(1 - \frac{\left(\frac{E_b}{N_0}\right)_{req}}{G_{traffic}} \sum_{p=1}^{\Pi} N_p \omega_p\right) = \frac{\left(\frac{E_b}{N_0}\right)_{req}}{G_{traffic}} \sum_{p=1}^{\Pi} N_p[L_p(N_{th} + I_{other,p}) + \omega_p P_{pilot}] \quad (7b)$$

$$P_{traffic} = \frac{\frac{\left(\frac{E_b}{N_0}\right)_{req}}{G_{traffic}} \sum_{p=1}^{\Pi} N_p[L_p(N_{th} + I_{other,p}) + \omega_p P_{pilot}]}{1 - \frac{\left(\frac{E_b}{N_0}\right)_{req}}{G_{traffic}} \sum_{p=1}^{\Pi} N_p \omega_p}. \quad (7c)$$

Note how the power of the traffic depends on the orthogonality factor. For the above equation to be valid, the following condition must hold:

$$\frac{\left(\frac{E_b}{N_0}\right)_{req}}{G_{traffic}} \sum_{p=1}^{\Pi} N_p \omega_p < 1. \quad (8)$$

This requirement is actually comparable with the uplink. In the UL, the pole capacity is $$N_{max,\, UL} = \frac{G_{traffic}}{\left(\frac{E_b}{N_0}\right)_{req}}. \quad (9)$$

In the worst-case scenario, i.e. with $\omega_p=1$, results in $$N_{total} = \sum_{p=1}^{\Pi} N_p < \frac{G_{traffic}}{\left(\frac{E_b}{N_0}\right)_{req}}, \quad (10)$$

which puts the same constraint on the DL, regardless of the available transmission power. Note that the value for $G_{traffic}$ and the desired $E_b/N_0$ may be different in UL and DL.

The total desired BS transmission power $P_{BS}$ necessary for covering all $\Pi$ pixels is $$P_{BS} = P_{traffic} + P_{pilot}. \quad (11)$$

In the above expressions some value $I_{other,p}$ was introduced.

If a particular cell n is considered, this is given by $$I_{other,p} = \sum_{m \neq n} \frac{P_{BS,m}}{L_{m,p}}, \quad (12)$$

where n is the index of the serving cell to which pixel p belongs, m is the index of any other cell, $P_{BS,m}$ is the transmission power used for cell m and $L_{m,p}$ is the path loss between cell m and pixel p, taking into account all other losses and gains as well.

Initialization

The base station transmission power $P_{BS,m}$ is not known initially. Instead an initial guess can be made. This guess is refined by calculating the desired transmission power for each base station again. This can be done several times, and for each iteration one will get a more exact estimate.

The first step of the algorithm is thus to assign $P_{BS,m}$ some realistic value, e.g. only the pilot power or the maximum power, or some value in between. For N base stations, a set of initial values is $$P_{BS,n}^{(0)} \forall n=1, \ldots, N. \quad (13)$$

For each pixel p, with assigned base station n, one calculates the interference as $$I_{other,p}^{(0)} = \sum_{m \neq n} \frac{P_{BS,m}^{(0)}}{L_{m,p}}. \quad (14)$$

Iterations

In the next step one estimates the power for the traffic channels for each cell. Together with the pilot power this gives a revised estimate of the desired total power. An iteration index i is used. In the first iteration i=1. (i=0 is the initialization.)

For each cell a value $P_{BS,n}^{(i)}$ is obtained, which depends on the estimates from the previous iteration i−1.

This procedure can be repeated several times until the algorithm converges, i.e. when the base station transmission power only changes very little between two iterations.

Final Evaluation

After convergence, the final evaluation can be made. The first criteria to check is that the desired transmission power for each cell does not exceed the maximum transmission power:

$$P_{BS,n} \leq P_{BS,n,max}. \quad (15)$$

If the maximum power is exceeded, this means that the DL is the limiting factor. Several options then exist, e.g.

- the network can be expanded by adding more cells, sectors or frequencies. This requires that a new UL evaluation is made.
- the pilot power can be reduced to give more room for traffic power and, possibly, reduce cell coverage. Before this is done, one should, however, control that the pilot coverage is not already too small. After a change of pilot power, the DL evaluation must be re-started.

If the maximum power is not exceeded, the pilot coverage and the traffic coverage can be analyzed. One might find that the pilot coverage is too small or too large, and the power should be adjusted accordingly. If the pilot coverage is smaller than the traffic coverage, the pilot power may be increased and vice versa. An adjustment of the pilot power requires that the evaluation is re-started, because the interference situation changes.

In addition, other kinds of analysis may be made as well, such as desired Tx power for a user at a certain position, link budget margins, outage probability and so on.

It can be relevant to check whether the coverage in the downlink does not limit the assumptions made for the uplink. For example, for a UE at a certain position to be in soft HO in the UL, the corresponding cells must indeed have coverage with at least the pilot signal in the downlink.

The DL evaluation can therefore be used not only to evaluate the DL itself, but also to verify the validity of the UL. The outcome might be that because the DL is the limiting factor, not all pixels can be served, and therefore one might want to re-evaluate the UL as well.

Including Soft HO Gain

The effects of soft HO, an improved link budget and therefore less desired transmission power, can be taken care of by modifying the corresponding parameters in the equation for calculating the total traffic channel power $P_{traffic}$. For example, the path loss $L_p$ can be replaced by $L_p/G_{SHO}$, where $G_{SHO}$ is the soft HO gain. This is equal to an improvement of the link budget. The desired $E_b/N_0$ can be modified to model the reduction in desired transmission power. Alternatively, an extra factor that directly takes all soft HO effects into account may be introduced in the equations.

Alternative Ways of Using the Evaluation Procedure

As an alternative to check whether the base station transmission power does not exceed the maximum power after the iterations, one may do it within each iteration instead. If the maximum power is exceeded, one may remove the "worst" pixels (in terms of interference) from the coverage area until the power is not exceeded. The reduced coverage area is then used for the next iteration. Alternatively, the pilot power can be reduced, thereby giving more room for the traffic, reducing interference, but possibly also reducing coverage in itself.

If one suspects coverage problems in the DL, it might be practical to begin with a pilot power of zero, i.e. $P_{pilot}=0$. The evaluation will then show if the base station transmission power is sufficient for the traffic to be served. Should this not be the case, capacity-enhancing measures can be taken before pilot power is added.

Maximum Capacity in the Downlink

An estimate of the maximum downlink capacity is quite easy to obtain, at least for a homogenous traffic load, or when all traffic is in one pixel. For the case of a homogenous load there are $N_0$ users per pixel, $$N_p = N_0 \quad (16)$$

and thus, using the previously introduced notation, $$P_{traffic} = N_0 \frac{\left(\frac{E_b}{N_0}\right)_{req}}{G_{traffic}} \sum_{p=1}^{\Pi} L_p\left(N_{th} + \frac{\omega_p(P_{pilot} + P_{traffic})}{L_p} + I_{other,p}\right) \quad (17)$$

If the maximum transmission power is used in each cell, for the cell of interest it is obtained that $$N_0 = \frac{G_{traffic}}{\left(\frac{E_b}{N_0}\right)_{req}} \frac{P_{BS,max} - P_{pilot}}{\sum_{p=1}^{\Pi} L_p\left(N_{th} + \frac{\omega_p P_{BS,max}}{L_p} + I_{other,p}\right)}. \quad (18)$$

The maximum number of users in the cell is then $N_{max} = N_0 \Pi$.

For a singe cell (which gives $I_{other,p}=0$), and disregarding the thermal noise, then, $$N_0 = \frac{G_{traffic}}{\left(\frac{E_b}{N_0}\right)_{req}} \frac{P_{BS,max} - P_{pilot}}{\sum_{p=1}^{\Pi} \omega_p P_{BS,max}}. \quad (19)$$

Suppose that not only the user density, but also the orthogonality factor is the same in all cells, namely $\omega_p = \omega_0$ it is obtained $$N_0 = \frac{G_{traffic}}{\left(\frac{E_b}{N_0}\right)_{req}} \frac{P_{BS,max} - P_{pilot}}{\omega_0 \Pi P_{BS,max}}, \quad (20)$$

and, consequently, $$N_{max} = \frac{G_{traffic}}{\left(\frac{E_b}{N_0}\right)_{req}} \frac{P_{BS,max} - P_{pilot}}{\omega_0 P_{BS,max}}. \quad (21)$$

Compared to the UL, the maximum capacity does not only depend on the processing gain and the desired $E_b/N_0$, but also on available power and the orthogonality factor.

The invention claimed is:

1. A method for planning and/or evaluation of a downlink coverage in a radio network comprising one or more service areas, each service area comprising at least one base station defining at least one cell, the method comprising the steps of:
  defining a grid on the one or more service areas;
  assigning the at least one cell to pixels defined by the grid;
  assigning a pilot power to the at least one cell;
  estimating a desired downlink transmission power for the at least one cell; and
  comparing the desired downlink transmission power to a maximum transmission power of the one or more base station;
  wherein the desired downlink transmission power $P_{BS}$ is estimated using the formula $P_{BS}=P_{traffic}+P_{pilot}$, where $P_{pilot}$ is the pilot power and $$P_{traffic} = \frac{\frac{\left(\frac{E_b}{N_0}\right)_{req}}{G_{traffic}} \sum_{p=1}^{\Pi} N_p [L_p(N_{th}+I_{other,p}) + \omega_p P_{pilot}]}{1 - \frac{\left(\frac{E_b}{N_0}\right)_{req}}{G_{traffic}} \sum_{p=1}^{\Pi} N_p \omega_p}$$

is a power for one or more downlink traffic channels.

2. The method according to claim 1 further comprising the step of: if the desired downlink transmission power is larger than the maximum transmission power, making one or more changes in the radio network and restarting the planning and/or evaluation of the downlink coverage.

3. The method according to claim 2 wherein the one or more changes in the radio network comprise an expansion of the radio network by adding one or more cells, sectors or frequencies.

4. The method according to claim 2 wherein the one or more changes in the radio network comprise a reduction of the pilot power.

5. The method according to claim 1 further comprising the steps of:
  if the maximum transmission power is not exceeded by the estimated desired downlink transmission power, validating the estimated desired downlink transmission power; and
  if the outcome of the validation is that the estimated desired downlink transmission power is invalid, restarting the planning and/or evaluation of the downlink coverage.

6. The method according to claim 5 wherein the validation step comprises the steps of:
  comparing the downlink coverage for a pilot signal to the downlink coverage for one or more downlink traffic channels; and
  changing the pilot power if the pilot signal is too small or too large in comparison to the traffic signal.

7. The method according to claim 5 wherein the validation step comprises the steps of:
  evaluating whether the estimated desired downlink transmission power does not limit any assumptions made in a planning and/or evaluation of an uplink coverage performed prior to the downlink planning and/or evaluation; and
  changing one or more parameters in the radio network.

8. The method according to claim 1 further comprising the step of using a grid definition and a cell-to-pixels assignment, both derived from a planning and/or evaluation of an uplink coverage performed prior to the downlink planning and/or evaluation.

9. The method according to claim 1 wherein an inter-cell interference effect is included in the estimation of the desired downlink transmission power.

10. The method according to claim 1 wherein a soft handover effect is included in the estimation of the desired downlink transmission power.

11. The method according to claim 1 wherein the radio network is a CDMA network.

12. A radio network comprising one or more service areas, each service area comprising at least one base station defining at least one cell, in which the downlink coverage is determined by a method according to claim 1.

13. A system for planning and/or evaluation of a downlink coverage in a radio network comprising one or more service areas, each service area comprising at least one base station defining at least one cell, the system comprising:
  means for defining a grid on the one or more service areas;
  means for assigning the at least one cell to pixels defined by the grid;
  means for assigning a pilot power to the at least one cell;
  means for estimating a desired downlink transmission power for the at least one cell; and
  means for comparing the desired downlink transmission power to a maximum transmission power of the one or more base station;
  wherein the desired downlink transmission power $P_{BS}$ is estimated using the formula $P_{BS}=P_{traffic}+P_{pilot}$, where $P_{pilot}$ is the pilot power and $$P_{traffic} = \frac{\frac{\left(\frac{E_b}{N_0}\right)_{req}}{G_{traffic}} \sum_{p=1}^{\Pi} N_p [L_p(N_{th}+I_{other,p}) + \omega_p P_{pilot}]}{1 - \frac{\left(\frac{E_b}{N_0}\right)_{req}}{G_{traffic}} \sum_{p=1}^{\Pi} N_p \omega_p}$$

is a power for one or more downlink traffic channels.

14. The system according to claim 13 further comprising one or more modules.

15. The system according to claim 14 wherein the one or more modules are provided to make one or more changes in the radio network and restart the planning and/or evaluation of the downlink coverage.

16. The system according to claim 15 wherein the one or more modules are provided to expand the radio network by adding one or more cells, sectors or frequencies.

17. The system according to claim 15 wherein the one or more modules are provided to reduce the pilot power.

18. The system according to claim 14 wherein the one or more modules are provided to validate the estimated desired downlink transmission and restart the planning and/or evaluation of the downlink coverage.

19. The system according to claim 18 wherein the one or more modules are provided to compare the downlink coverage for a pilot signal to the downlink coverage for the one or more downlink traffic channels and change the pilot power if the pilot signal is too small or too large in comparison to the traffic signal.

20. The system according to claim 18 wherein the one or more modules are provided to evaluate whether the estimated desired downlink transmission power does not limit any assumptions made in a planning and/or evaluation of an uplink coverage performed prior to the downlink planning and/or evaluation, and change one or more parameters in the radio network.

21. The system according to claim 14 wherein the one or more modules are provided to derive a grid definition and a cell-to-pixels assignment used in a planning and/or evaluation of an uplink coverage performed prior to the downlink planning and/or evaluation.

22. The system according to claim 14 wherein the one or more modules are provided to include an inter-cell interference effect in the estimation of the desired downlink transmission power.

23. The system according to claim 14 wherein the one or more modules are provided to include a soft handover effect in the estimation of the desired downlink transmission power.

24. The system according to claim 13 wherein the radio network is a CDMA network.

25. A computer program, having computer readable instructions and stored on a computer readable medium, for planning and/or evaluation of a downlink coverage in a radio network comprising one or more service areas, each service area comprising at least one base station defining at least one cell, wherein the instructions comprise:
one or more modules for defining a grid on the one or more service areas;
one or more modules for assigning the at least one cell to pixels defined by the grid;
one or more modules for assigning a pilot power to the at least one cell;
one or more modules for estimating a desired downlink transmission power for the at least one cell; and
one or more modules for comparing the desired downlink transmission power to a maximum transmission power of the one or more base station;
wherein the desired downlink transmission power $P_{BS}$ is estimated using the formula $P_{BS} = P_{traffic} + P_{pilot}$, where $P_{pilot}$ is the pilot power and $$P_{traffic} = \frac{\frac{\left(\frac{E_b}{N_0}\right)_{req}}{G_{traffic}} \sum_{p=1}^{n} N_p [L_p(N_{th} + I_{other,p}) + \omega_p P_{pilot}]}{1 - \frac{\left(\frac{E_b}{N_0}\right)_{req}}{G_{traffic}} \sum_{p=1}^{n} N_p \omega_p}$$

is a power for one or more downlink traffic channels.

26. The computer program according to claim 25 wherein the instructions further comprise software code portions which, when run on a computer system, perform one or more steps of the method as claimed in claim 1.

* * * * *